(12) United States Patent
Chiou et al.

(10) Patent No.: US 8,980,773 B2
(45) Date of Patent: Mar. 17, 2015

(54) SHAPED BODY ARMOR AND METHOD OF MAKING

(75) Inventors: Minshon J. Chiou, Chesterfield, VA (US); Clifford K. Deakyne, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 474 days.

(21) Appl. No.: 12/687,211

(22) Filed: Jan. 14, 2010

(65) Prior Publication Data

US 2012/0186006 A1 Jul. 26, 2012

(51) Int. Cl.
| | |
|---|---|
| *B32B 27/12* | (2006.01) |
| *B32B 5/12* | (2006.01) |
| *A41D 13/00* | (2006.01) |
| *B32B 1/04* | (2006.01) |
| *B32B 3/02* | (2006.01) |
| *B32B 5/06* | (2006.01) |
| *B32B 5/24* | (2006.01) |
| *F41H 5/04* | (2006.01) |
| *B29C 70/46* | (2006.01) |
| *B32B 5/28* | (2006.01) |
| *B32B 27/02* | (2006.01) |
| *B32B 27/04* | (2006.01) |
| *B32B 27/34* | (2006.01) |
| *F41H 1/02* | (2006.01) |
| *B32B 5/30* | (2006.01) |
| *B29L 31/00* | (2006.01) |

(52) U.S. Cl.
CPC ... *B32B 1/04* (2013.01); *B32B 3/02* (2013.01); *B32B 5/30* (2013.01); *B32B 5/06* (2013.01); *B32B 5/24* (2013.01); *B32B 2255/02* (2013.01); *B32B 2262/0269* (2013.01); *B32B 2262/0261* (2013.01); *B32B 2262/0253* (2013.01); *B32B 2250/05* (2013.01); *F41H 5/0478* (2013.01); *B29C 70/46* (2013.01); *B29K 2277/10* (2013.01); *B29L 2031/768* (2013.01); *B32B 5/12* (2013.01); *B32B 5/28* (2013.01); *B32B 27/02* (2013.01); *B32B 27/04* (2013.01); *B32B 27/12* (2013.01); *B32B 27/34* (2013.01); *F41H 1/02* (2013.01); *F41H 5/0485* (2013.01)
USPC ........... 442/134; 442/135; 428/105; 428/109; 428/110; 428/112; 428/113; 428/114; 2/463

(58) Field of Classification Search
CPC ............ B32B 1/04; B32B 27/12; B32B 5/12; B32B 5/28; F41H 1/02; F41H 5/0485; B29C 70/46; B29K 2277/10; B29L 2031/768
USPC ............... 442/134, 135, 394–399; 428/298.1, 428/300.1; 2/455–467, 411–415; 89/36.01–36.05, 901, 914–916
See application file for complete search history.

(56) References Cited

U.S. PATENT DOCUMENTS

| | | | | |
|---|---|---|---|---|
| 4,613,535 | A | * 9/1986 | Harpell et al. | ................ 428/113 |
| 5,943,694 | A | * 8/1999 | Moureaux et al. | ................. 2/2.5 |
| 6,034,004 | A | 3/2000 | Fels et al. | |
| 6,048,486 | A | * 4/2000 | Fels et al. | ...................... 264/324 |
| 7,910,503 | B2 | * 3/2011 | Krueger et al. | ................ 442/135 |
| 2009/0255022 | A1 | * 10/2009 | Smith et al. | ........................ 2/2.5 |
| 2010/0162458 | A1 | * 7/2010 | Beugels et al. | .................... 2/2.5 |

OTHER PUBLICATIONS

PCT Search Report and Written Opinion, PCT/US2011/021347, Jan. 14, 2011.

\* cited by examiner

*Primary Examiner* — Jennifer A Steele

(57) ABSTRACT

This invention pertains to an article for use in body armor, comprising a plurality of discrete sheet subassemblies contoured to the shape of a female breast arranged in a stack, without bonding, such that the breast contours are positioned on top of each other, each of the subassemblies comprising at least two nonwoven layers of high tenacity yarns such as par-aramid, a binder and a resin.

5 Claims, No Drawings

SHAPED BODY ARMOR AND METHOD OF MAKING

BACKGROUND OF THE INVENTION

1. Field of the Invention

This invention relates to an article for use in female body armor and a method for making the article.

2. Description of Related Art

U.S. Pat. No. 6,048,486 to Fels at al describes a process for forming contours in aramid flat structures, in particular textile flat structures made from aramid fibers. Contouring is performed by molding in a temperature range of 180-300 degrees C. and a press pressure range of 4-8 bars. The flat structures contoured by molding are suited in particular for the manufacture of antiballistic women's protective clothing as well as of antiballistic helmets. The effectiveness against penetration of bullets and splinters is not affected by the molding process.

U.S. Pat. No. 6,034,004 to Fels et al covers protective clothing comprising one protective layer or a plurality of protective layers superimposed on and optionally joined to one another that may contain textile flat structures made from antiballistically acting fibers, wherein the protective layers contain contoured shapes for fitting to body shapes imparted by a molding process that is conducted without the concurrent use of a resin.

U.S. Pat. No. 5,943,694 to Moureaux et al describes armor, in particular body armor for female wearers, that is made of multiple layers of penetration-resistant material for example made of polyaramid fibers, specially shaped to fit over a shaped area to be protected, e.g. the bust of a female wearer. The armor's shaped part is held in shape by a series of darts in successive layers of the material. Each dart in a material layer comprises a generally V-shaped section whose edges are joined to form the dart. The V-shaped section of the material is folded on itself to form a pleat which is folded over to one side of the dart to form an added thickness overlaying or underlying an adjacent part of the material.

SUMMARY OF THE INVENTION

This invention relates to an article for use in body armor, comprising a plurality of discrete sheet subassemblies contoured to the shape of a female breast arranged in a stack, without bonding, such that the breast contours are positioned on top of each other, each of the subassemblies being a sheet comprising:

(i) at least two nonwoven layers, each of the layers comprising a plurality of nonwoven continuous multifilament polymeric yarns having a linear density of from 50 to 4500 dtex, a tenacity of from 10 to 65 g/dtex, a modulus of from 150 to 2700 g/dtex, and an elongation to break of from 1 to 8 percent, the yarns in the layers being arranged substantially parallel to each other with the proviso that the yarns in any one layer are offset in orientation with respect to the orientation of yarns of any other layer contacting the any one layer, (ii) binder of thermoset or thermoplastic film or powder, and (iii) coating resin such that the weight percent of the binder and coating resin is in the range of from 0.5% to 30% when expressed as a percentage of the total weight of resin, binder plus yarn in one of the subassemblies, wherein the subassemblies are free of darts, seams or pleats.

The invention also covers a method of forming a contoured body armor article comprising, in order, the steps of:

(a) cutting to length a flat nonwoven subassembly sheet, the sheet further comprising:

(i) at least two nonwoven layers of continuous multifilament polymeric yarns having a linear density of from 50 to 4500 dtex, a tenacity of from 10 to 65 g/dtex, a modulus of from 150 to 2700 g/dtex, and an elongation to break of from 1 to 8 percent, the yarns in each layer being arranged substantially parallel to each other with the proviso that the yarns in any one layer are offset in orientation with respect to the orientation of yarns of any other layer contacting the any one layer, (ii) binder, and (iii) coating resin such that the weight percent of binder and coating resin is in the range of from 0.5% to 30% when expressed as a percentage of the total weight of resin, binder plus yarn in the subassembly, (b) preheating the cut sheet to a temperature of from 100 degrees C. to 160 degrees C., (c) placing the preheated sheet, without darting or pleating, into a mold having at least one contoured surface, (d) molding the sheet at a temperature of from 100 to 175 degrees C. and a pressure of from 0.3 to 100 bar for between 0.5 to 15 minutes to form a contoured subassembly, (e) cooling the subassembly to a temperature of 60 degrees C. or lower, (f) removing the subassembly from the mold, (g) repeating steps (a) to (f) as required to give the desired number of subassemblies, and (h) assembling a plurality of subassemblies into a body armor article such that the contours are positioned on top of each other.

DETAILED DESCRIPTION

The Article

The article is for incorporation into body armor and comprises a plurality of discrete sheet subassemblies contoured to the shape of a female breast arranged in a stack, without bonding, such that the breast contours are positioned on top of each other. By discrete we mean that, other than having some tack stitches, each subassembly is free to move within the article with respect to other subassemblies in the article. In other words, the subassemblies are not bonded together. The freedom of one subassembly to move relative to another subassembly is useful during ballistic impact. Tack stitching is a common technique used in the soft body armor industry to provide some coherence to the assembly and prevent the subassemblies from coming apart when the assembly is fitted into a vest pack. Fine filamentary yarns of material such as cotton or para-aramid are used for tack stitching through the stack of subassemblies. The stitches are normally positioned across the corners of the assembly although a diagonal stitch pattern across the assembly may also be used. Preferably the subassemblies are only stitched together at 10% or less of their surface areas allowing all or most of the remainder of the subassemblies to move laterally and/or separate with respect to adjacent subassemblies. More preferably, subassemblies are stitched by less than 5%, and even more preferably less than 3%, of their surface area.

Preferably, the stack of subassemblies forming the article has an areal density of 2.0 to 6.5 kg/m², and more preferably 3.0 to 5.5 kg/m², in a preferred embodiment the article comprises from 4 to 60 subassemblies and more preferably from 4 to 30 subassemblies. Preferably the orientation of the yarns on the outer surfaces of one subassembly is different from the orientation of yarns on the outer surfaces of the subassemblies contacting the one subassembly.

Subassembly

A subassembly is a sheet comprising a plurality of layers of unidirectional fabric. By unidirectional we mean that all the reinforcement yarns within a layer lie in the same direction. Such a layer is often referred to as a nonwoven layer. In a preferred embodiment the subassembly comprises four nonwoven fabric layers and in a more preferred embodiment it comprises two nonwoven fabric layers. The orientation of yarns in one layer of the subassembly is different from the orientation of the yarns in an adjacent layer. As an example the orientation of yarns in the first layer of a nonwoven fabric may be at zero degrees i.e. in the machine or run direction while the yarns in a second layer may be oriented at an angle of 90 degrees with respect to the orientation of yarns in the first layer. Other common orientation angles include +45 degrees and −45 degrees. In a preferred embodiment the yarns in successive layers of the nonwoven fabric are oriented at +45 degrees and −45 degrees with respect to each other.

The nonwoven fabric layers comprise multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be either non-crimped or crimped to have a saw tooth shaped crimp along its length, with a crimp (or repeating bend) frequency of about 3.5 to about 18 crimps per inch (about 1.4 to about 7.1 crimps per cm).

Preferably the yarns have a yarn tenacity of at least 7 grams per decitex (dtex) and a modulus of at least 100 grams per dtex. Preferably, the yarns have a linear density of 50 to 4500 dtex, a tenacity of 10 to 65 g/dtex, a modulus of 150 to 2700 g/dtex, and an elongation to break of 1 to 8 percent. More preferably, the yarns have a linear density of 100 to 3500 dtex, a tenacity of 15 to 50 g/dtex, a modulus of 200 to 2200 g/dtex, and an elongation to break of 1.5 to 5 percent.

Suitable materials for the yarn include polyamide, polyolefin, polyazole and mixtures thereof.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968.

A preferred aramid is a para-aramid. A preferred para-aramid is poly (p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2, 6-naphthaloyl chloride or chloro- or dichloroterephthaloyl chloride or 3, 4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

When the polymer is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE) or ultra high molecular weight polyethylene (UHMWPE In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 grams per dtex or greater. If the polybenzazole is a polybenzothioazole, preferably it is poly (p-phenylene benzobisthiazole). If the polybenzazole is a polybenzoxazole, preferably it is poly (p-phenylene benzobisoxazole) and more preferably poly (p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly(pyridobisoxazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

The yarns within a nonwoven layer of the subassembly may comprise yarns from different polymers. In an alternative embodiment the subassembly may comprise layers having different polymeric yarns in different layers but all the yarns within a layer being from the same polymer.

In preferred embodiments there is a binding layer between the nonwoven fabric layers of the subassembly to keep the nonwoven layers together and stop them sliding over one another. The binding layer may be a thermoset or thermoplastic material. The binding layer may be in a continuous form such as a film or discontinuous form such as a perforated film or a powder. Suitable materials for this binding layer include thermoplastic polyolefinic films, thermoplastic elastomeric films, polyester films, polyamide films, urethane films and mixtures thereof. Useful thermoplastic polyolefinic films include those of low density polyethylene films, high density polyethylene films, and linear low density polyethylene films. The binding layer does not fully impregnate into the yarns.

As an alternative or in addition to the binding layer, binding threads may also be present. These threads are stitched through the nonwoven fabric layers of the subassembly. Any suitable stitching thread may be used with polyester, aramid, polyethylene and nylon being particularly suited.

The yarns of the nonwoven fabric subassembly layers are preferably coated with a matrix resin. The yarn coating resin may be thermoplastic or thermoset. Suitable materials include polymers or resins in the form of a viscous or viscoelastic liquid. Preferred materials are polyolefins, in particular polyalpha-olefins or modified polyolefins, polyvinyl alcohol derivatives, polyisoprenes, polybutadienes, polybutenes, polyisobutylenes, polyesters, polyacrylates, polyamides, polysulfones, polysulfides, polyurethanes, polycarbonates, polyfluoro-carbons, silicones, glycols, liquid block copolymers, polystyrene-polybutadiene-polystyrene, ethylene copolypropylene, polyacrylics, epoxies, phenolics and liquid rubbers. Preferred polyolefins are polyethylene and polypropylene. Preferred glycols are polypropylene glycol and polyethylene glycol. A preferred copolymer is polybutadiene-co-acrylonitrile. Polyisobutylene is a preferred resin. In a preferred embodiment, the resin coating does not fully impregnate the yarns. Preferably the resin coating level is present in an amount from 0.5 to 30 and more preferably from 1.0 to 15 weight percent based on the total weight of yarn plus resin coating.

Method

A method for forming a contoured body armor article consisting of the above materials comprises, in order, the steps of:

(a) cutting to length a flat nonwoven subassembly sheet, the sheet further comprising:

(i) at least two nonwoven layers of continuous multifilament polymeric yarns having a linear density of from 50 to 4500 dtex, a tenacity of from 7 to 65 g/dtex, a modulus of from 100 to 2700 g/dtex, and an elongation to break of from 1 to 8 percent, the yarns in each layer being arranged substantially parallel to each other with the proviso that the yarns in any one layer are offset in orientation with respect to the orientation of yarns of any other layer contacting the any one layer, (ii) binder of thermoset or thermoplastic film or powder, and (iii) coating resin such that the weight percent of binder and coating resin is in the range of from 0.5% to 30%, preferably in the range of 1 to 15%, when expressed as a percentage of the total weight of resin plus yarn in the subassembly (b) preheating a cut sheet to a temperature of from 100 degrees C. to 160 degrees C., (c) placing the preheated sheet, without darting or pleating, into a mold having at least one contoured surface, (d) molding the sheet at a temperature of from 100 to 175 degrees C. and a pressure of from 0.3 to 100 bar, preferably from 8.5 to 80 bar, for between 0.5 to 15 minutes to form a contoured subassembly, (e) cooling the sheet to a temperature of 60 degrees C. or lower, (f) removing the sheet from the mold, (g) repeating steps (a) to (f) as required to give the desired number of subassemblies, and (h) assembling a plurality of subassemblies into a body armor article such that the contours are positioned on top of each other.

The subassembly sheet material is normally provided in roll form and is cut to suitable lengths. A cut sheet is then preheated to a temperature of from 100 degrees C. to 160 degrees C. Heating may be carried out in an oven or by other means such as dielectric heat. The actual temperature used will be governed by the choice of resin in the fabric subassembly. The temperature and dwell time should be sufficient to soften the resin and make the subassembly more flexible. In an optional embodiment, the preheated sheet may be partially shaped or preformed without darting or pleating. Tools for such a process do not require the same dimensional accuracy as in the final molding step and thus a rough preliminary shape is imparted to the sheet. The preforming pressure is from 0.3 to 100 bar, preferably from 8.5 to 80 bar, The preheated sheet is then paced in a mold having a surface in the shape of the desired contour. The sheet is placed in the mold without darting or pleating of the sheet. Depending on the process used to shape the article, the mold comprises either one or two sections. For matched mold processing, the mold consists of two sections one of which is contoured to the inner surface of the article with the other being contoured to the outer surface of the article. In alternative processes such as forming in an oven or autoclave there is only one section, that section having the contour of the inner surface of the article. A vacuum bag assembly then provides the necessary compaction of the subassembly onto the mold surface. Such forming techniques are well known in the composite materials processing industry. The sheet is then molded at a temperature of from 100 to 175 degrees C. and a pressure of from 0.3 to 100 bar, preferably from 8.5 to 80 bar, for between 0.5 to 15 minutes to form a contoured subassembly. The actual resin temperature and pressure used will be governed by the choice of resin in the fabric subassembly. The mold is cooled to a temperature of 60 degrees C. or lower and the subassembly removed from the mold.

The above steps are repeated to give the desired number of subassemblies. A plurality of subassemblies is then combined to produce the article. The subassemblies are stacked together in such a way that the contoured sections fit on top of each other. Once stacked, the final assembly has tacking stitches applied. Preferably the stitches are positioned across the corners. The article is then ready for fitting into a vest pack.

In an optional embodiment, a plurality of sheets may be preheated in a stack at the same time. In such a process, a release layer is positioned between each sheet. That is, the release layer is sandwiched between the upper surface of a first fabric and the lower surface of a second fabric and so on. After heating the release layers are removed. A variety of release layers are available from the resin processing industry and any suitable one may be used.

Test Methods

The following test methods were used in the following Examples.

Temperature: All temperatures are measured in degrees Celsius (° C.).

Linear Density: The linear density of a yarn or fiber is determined by weighing a known length of the yarn or fiber based on the procedures described in ASTM D1907-97 and D885-98. Dtex or "dtex" is defined as the weight, in grams, of 10,000 meters of the yarn or fiber. Denier (d) is 9/10 times the dtex (dtex).

Tensile Properties: The fibers to be tested were conditioned and then tensile tested based on the procedures described in ASTM D885-98. Tenacity (breaking tenacity), modulus of elasticity and elongation to break are determined by breaking test fibers on an Instron tester.

Areal Density: The areal density of the fabric layer is determined by measuring the weight of each single layer of selected size, e.g., 10 cm×10 cm. The areal density of a composite structure is determined by the sum of the areal densities of the individual layers.

Ballistic Penetration and Backface Deformation Performance: Ballistic tests of the multi-layer panels were conducted in accordance with NIJ Standard—0101.04 "Ballistic Resistance of Personal Body Armor", issued in September 2000 which defines capabilities for body armor for level IIA, II, IIIA and III protection. The reported values are average values for the number of shots fired for each example. Remington 9 mm full metal jacketed projectiles were used.

EXAMPLES

The following examples are given to illustrate the invention and should not be interpreted as limiting it in any way. Examples prepared according to the process or processes of the current invention are indicated by numerical values. Control or Comparative Examples are indicated by letters.

In all the Examples and Comparative Examples the yarns used were of Kevlar® 129, available from E.I. du Pont de Nemours and Company, Wilmington, Del. (DuPont), having a nominal tenacity of 24.5 g/dtex, a nominal modulus of 680 g/dtex, and a nominal elongation to break of 3.4 percent.

Example 1

In this example, a single sheet of nonwoven fabric available from DuPont was used. This fabric is commercially available under the tradename Kevlar® XPTM S102 and comprises two layers of unidirectionally aligned Kevlar® 129 para-aramid yarns in a +45°/−45° configuration. The two layer fabric sheet had a nominal weight of 500 g/m$^2$.

Comparative Example A

In this example, fabric style 726 was used. Style 726 is a plain weave woven fabric available from JPS Composite Materials, Anderson, SC made of 840 denier (930 dtex) para-aramid Kevlar® 129 yarn. The fabric has 26×26 ends per inch (10.2×10.2 ends per centimeter) and a nominal areal weight of 203 g/m$^2$.

The fabrics of Example 1 and Comparative Example A were both molded into the contour of a female vest. The mold tool was made by cutting a 102 mm diameter shot put in half and bonding the two hemispheres to an aluminum plate using a high conductivity 260 degree C. curing epoxy resin. The epoxy resin used to bond the shot put to the aluminum plate was Coltronics Corp, DURALCO 132 IP mixed at a ratio of 100 parts resin to 8 parts hardener. The resin was cured for 24 hours at room temperature followed by a post cure at 180 C for 1 hour. This is the lower half of the mold. A matched mold upper half was made by casting silicone rubber over the lower half of the mold and allowing the block of rubber to solidify. The rectangular solid silicon block had concave hemispherical cavities matching the convex hemispherical extensions of the flat plate lower half mold.

A 38 cm by 38 cm sample Example 1 fabric was cut from a feedstock roll. The sample was preheated to a temperature of 130 degrees C. and placed, without darting or folding over a spunlaced Nomex® breather ply on the lower half of a mold situated on a vacuum table. A 0.8 mm thick silicon sheet (per Mil Spec ZZ-R-765-CL 2 A&B) vacuum bladder was placed over the fabric and the lower part of the mold and sealed along then edges of the vacuum table. A vacuum of 0.7 bar was applied and the mold assembly raised to a temperature of 125 degrees C. This temperature was maintained for 3 minutes. The temperature was measured at the breast cup of the fabric. The mold was then cooled to 40 degrees C., the vacuum released and the shaped fabric removed.

A similar process was used for the fabric of comparative Example A except that the matched top of the mold was used. Four sheets of fabric were stacked together and molded. The mold temperature was 180 degrees C. and the applied pressure was 7 bar. These conditions replicate those of prior art U.S. Pat. No. 6,048,486 to Fels.

After removal from the mold, the cup depths of the contoured article of Example 1 and one of the four contoured fabric sheets of Comparative Example A were both measured for dimensional comparison. A thin ruler was placed across the cup opening and a second thin ruler was inserted into the cup measuring the maximum depth. The cup depth from Example 1 was 43 mm deep while that from Comparative Example A was only 30 mm deep even though both were formed with the same tooling. This demonstrates the better forming characteristics of the inventive process and article.

The stability of each article was further demonstrated by cutting, from each example, a 127 mm wide by 254 mm long rectangle. The length was cut in the fiber direction for Example 1 and in the warp direction for Comparative Example A. The cup was in the center of each cut strip. The two materials were then clamped in a set of air grips with 152 mm wide jaws and a 152 mm gage length. An Instron® 1125 CRE test machine was then used to load the samples through two cycles up to 400 psi stress. This was sufficient to pull the shape out of both test samples while still under load. After the two test cycles, the cup depth was measured as described above. The cup depth from Example 1 was 41 mm deep, a depth retention of 94%, and that from Comparative Example A was 15 mm deep, a depth retention of only 50%. This demonstrates the improved stability of the inventive process and article when compared to other art.

Example 2

In this example, ten sheets of nonwoven fabric were molded as per Example 1. The nonwoven fabric is commercially available from E.I. DuPont, Wilmington, Del. under the tradename Kevlar® XPTM S102 and comprises two layers of unidirectionally aligned Kevlar® 129 para-aramid yarns. The nominal basis weight of the two layer fabric sheet was 500 g/m$^2$. The ten sheets were stacked into an assembly with the breast contours positioned on top of each other. 25 mm long tack stitches were then stitched across the corners to provide some coherence to the assembled package. The assembly of ten sheets had an areal density of 5.0 kg/m$^2$.

Comparative Example B

In this example, ten sheets of flat Kevlar® XPTM S102 nonwoven fabric were stacked into an assembly without being molded into shape. Tack stitches, 25 mm long, were then stitched across the corners to provide some coherence to the assembled package. The flat assembly of ten sheets had an areal density of 5.0 kg/m$^2$.

Comparative Example C

In this example, twenty six sheets of fabric style 726 were molded as per Comparative Example A. The twenty six sheets were stacked into an assembly with the breast contours positioned on top of each other. Tack stitches, 25 mm long, were then stitched across the corners to provide some coherence to the assembled package. The assembly of twenty six sheets had an areal density of 5.2 kg/m².

Ballistic Testing

The assemblies of Example 2 and Comparative Examples B and C were subjected to ballistic tests and evaluated against the NIJ Standard.

The armor must have a backface deformation (BFD) of no more than of 44 mm from a projectile at a reference velocity ($V_0$) defined as 1430 ft/sec plus or minus (+/−) 30 feet per sec (436m/sec+/−9 m/sec) for NIJ Level IIIA. A second reported value is V50 which is a statistical measure that identifies the average velocity at which a bullet or a fragment penetrates the armor equipment in 50% of the shots, versus non penetration of the other 50%. The parameter measured is V50 at zero degrees where the degree angle refers to the obliquity of the projectile to the target. In Example 2 and Comparative Example 3, additional shots were also targeted at the breast cup. The results are shown in Table 1. The results show that Example 2 has an improved Back Face Deflection and V50, i.e. significantly lower Back Face Deflection and higher V50, when compared with the woven fabric construction of Comparative Example C, which was subjected to a similar molding process. Further, the molding process of Example 2 does not result in any decrease in ballistic performance when compared with an assembly of an identical structure that has not been molded as exemplified in Comparative Example B.

TABLE 1

| Reference | Molded | Areal Density (kg per sq · m) | V50 (m/sec) | BFD (mm) | Shot at Breast Cup |
|---|---|---|---|---|---|
| Example 2 | Yes | 5.0 | 510 | 26 | Pass |
| Comparative B | No | 5.0 | 511 | 24 | Not Applicable |
| Comparative C | Yes | 5.2 | 467 | 43 | Pass |

What is claimed is:

1. An article for use in body armor, comprising a plurality of discrete sheet subassemblies contoured to the shape of a female breast arranged in a stack, without bonding, such that the breast contours are positioned on top of each other, each of the subassemblies being a sheet comprising:
   (i) at least two nonwoven layers, each of the layers comprising a plurality of nonwoven continuous multifilament polymeric yarns having a linear density of from 50 to 4500 dtex, a tenacity of from 10 to 65 g/dtex, a modulus of from 150 to 2700g/dtex, and an elongation to break of from 1 to 8 percent, the yarns in the layers being arranged substantially parallel to each other with the proviso that the yarns in any one layer are offset in orientation with respect to the orientation of yarns of any other layer contacting the any one layer,
   (ii) binder of thermoset or thermoplastic film or powder, and
   (iii) resin coating not fully impregnating the yarns such that the weight percent of the binder and coating resin is in the range of from 0.5% to 30% when expressed as a percentage of the total weight of resin, binder plus yarn in one of the subassemblies, wherein the subassemblies are free of darts, seams or pleats, wherein
      (a) binding threads are stitched through the nonwoven fabric layers of the subassembly, and
      (b) the article maintains a depth retention of greater than 50% when a strip of article 254 mm long by 127 mm wide comprising a hemispherical shape having a radius of 51 mm is subjected to two pull stress cycles of up to 400 psi.

2. The article of claim 1, wherein the yarn polymer is selected from the group consisting of polyamide, polyolefin, polyarenazole or combinations thereof.

3. The article of claim 2, wherein the polyamide polymer is para-aramid.

4. The article of claim 1, wherein the coating resin is selected from the group consisting of thermoset, thermoplastic resin or mixtures thereof.

5. The article of claim 1, comprising from 4 to 60 discrete subassemblies.

\* \* \* \* \*